(12) United States Patent
Hsueh

(10) Patent No.: US 8,575,535 B2
(45) Date of Patent: Nov. 5, 2013

(54) SENSING DEVICES AND ELECTRONIC APPARATUSES USING THE SAME

(75) Inventor: Fu-Yuan Hsueh, Taoyuan County (TW)

(73) Assignee: Chimei Innolux Corporation, Miao-Li County (TW)

( * ) Notice: Subject to any disclaimer, the term of this patent is extended or adjusted under 35 U.S.C. 154(b) by 706 days.

(21) Appl. No.: 12/789,589

(22) Filed: May 28, 2010

(65) Prior Publication Data

US 2010/0309156 A1 Dec. 9, 2010

(30) Foreign Application Priority Data

Jun. 3, 2009 (TW) ................. 98118336 A

(51) Int. Cl.
*G01J 1/18* (2006.01)
*H04N 5/58* (2006.01)

(52) U.S. Cl.
USPC .................. 250/214 AL; 250/214 C; 345/207

(58) Field of Classification Search
USPC ............. 250/214 AL, 214 R, 214 C; 345/207
See application file for complete search history.

(56) References Cited

U.S. PATENT DOCUMENTS

| | | | |
|---|---|---|---|
| 5,506,411 A * | 4/1996 | Tasaki | 250/568 |
| 5,790,295 A * | 8/1998 | Devon | 398/202 |
| 6,066,843 A * | 5/2000 | Scheremeta | 250/214 AL |
| 6,359,274 B1 * | 3/2002 | Nixon et al. | 250/214 C |
| 6,504,142 B2 * | 1/2003 | Nixon et al. | 250/214 C |
| 6,737,629 B2 * | 5/2004 | Nixon et al. | 250/214 C |
| 7,109,465 B2 * | 9/2006 | Kok et al. | 250/214 AL |
| 7,218,860 B2 * | 5/2007 | Tan et al. | 398/128 |
| 7,330,668 B2 * | 2/2008 | Heimlicher | 398/202 |
| 7,683,305 B2 * | 3/2010 | Solhusvik et al. | 250/208.1 |
| 7,750,283 B2 * | 7/2010 | Hamilton et al. | 250/214 R |
| 8,242,429 B2 * | 8/2012 | Sarpeshkar et al. | 250/214 A |
| 2003/0122060 A1* | 7/2003 | Nixon et al. | 250/214 C |
| 2004/0195494 A1* | 10/2004 | Kok et al. | 250/214 AL |
| 2004/0211886 A1* | 10/2004 | Heimlicher | 250/214 C |
| 2004/0222359 A1* | 11/2004 | Nixon et al. | 250/214 C |
| 2008/0308714 A1* | 12/2008 | Hamilton et al. | 250/214 A |
| 2010/0309156 A1* | 12/2010 | Hsueh | 345/173 |

* cited by examiner

*Primary Examiner* — John Lee
(74) *Attorney, Agent, or Firm* — McClure, Qualey & Rodack, LLP

(57) ABSTRACT

A sensing device is provided to sense light and generates a sensing output signal indicating intensity of the light. The sensing device includes a photo element, a comparison circuit, and a logic circuit. The photo element senses the light and generates a current signal at a first node. The comparison circuit is coupled to the first node and receives the current signal. The comparison circuit includes a filter for filtering a high-frequency component on the current signal, and the comparison circuit generates a result signal according to the filtered current signal. The logic circuit receives the result signal and performs a logic operation to the result signal to generate the sensing output signal.

18 Claims, 4 Drawing Sheets

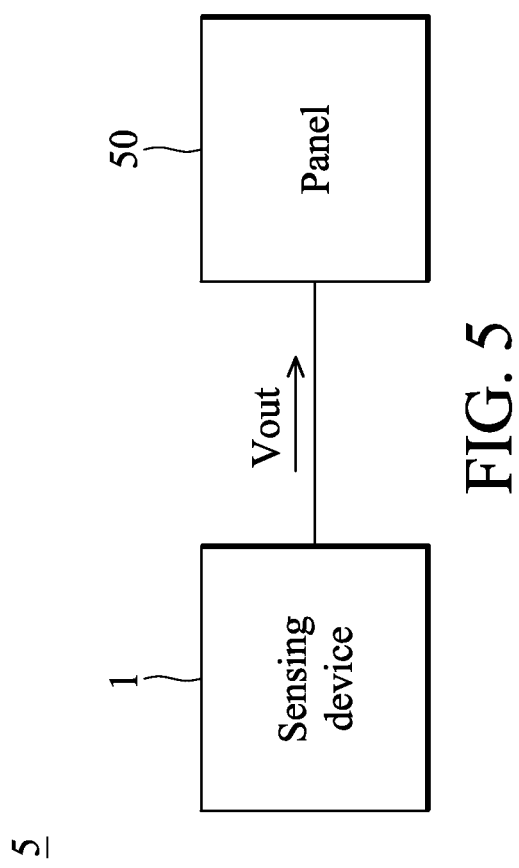

SENSING DEVICES AND ELECTRONIC APPARATUSES USING THE SAME

CROSS REFERENCE TO RELATED APPLICATIONS

This application claims the benefit of Taiwan application Serial No. 98118336 filed Jun. 3, 2009, the subject matter of which is incorporated herein by reference.

BACKGROUND OF THE INVENTION

1. Field of the Invention

The invention relates to a sensing device, and more particularly to a sensing device with a high signal-to-noise ratio (SNR).

2. Description of the Related Art

Currently, low power consumption is important for electronic apparatuses, especially mobile electronic apparatuses. Light-sensing devices are usually disposed in electronic apparatuses, such as mobile phones and mobile computers, to reduce power consumption of display panels. The light-sensing devices sense environmental brightness and generate control signals according to the sensed environmental brightness. Specifically, light-sensing devices control brightness of display panels of electronic apparatuses, so that the display panels do not always show images by high brightness, thus reducing power consumption. In dark environments however, noise affects of the light-sensing devices are increased due to the decrease in photo currents generated by photo elements of the light-sensing devices. Thus, control signals of light-sensing devices are affected by the noise, resulting in reduced signal-to-noise ratios of the light-sensing devices. Accordingly, brightness of display panels comprising the light-sensing devices are not effectively controlled to reduce power consumption.

Thus, it is desired to provide a light-sensing device which can filter high-frequency noises to increase the signal-to-noise ratio of light-sensing devices.

BRIEF SUMMARY OF THE INVENTION

An exemplary embodiment of a sensing device, used for sensing light and generating a sensing output signal indicating intensity of the light, is provided. The sensing device comprises a photo element, a comparison circuit, and a logic circuit. The photo element senses the light and generates a current signal at a first node. The comparison circuit is coupled to the first node and receives the current signal. The comparison circuit comprises a filter for filtering a high-frequency component of the current signal, and the comparison circuit generates a result signal according to the filtered current signal. The logic circuit receives the result signal and performs a logic operation to the result signal to generate the sensing output signal. In some embodiments, a cut-off frequency of the filter is lower than 20 kHz.

Another exemplary embodiment of a sensing device, used for sensing light and generating a sensing output signal indicating intensity of the light, is provided. The sensing device comprises a photo element, a comparison circuit, and a logic circuit. The photo element senses the light and generates a current signal at a first node. The comparison circuit is coupled to the first node. The comparison circuit receives the current signal and generates a result signal according to the current signal. The comparison circuit has a low gain. The logic circuit receives the result signal and performs a logic operation to the result signal to generate the sensing output signal.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 5 shows an exemplary embodiment of an electronic apparatus.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Sensing devices are provided. In an exemplary embodiment of a sensing device in FIG. 1, a sensing device 1 is used to sense light and generates a sensing output signal Vout according to intensity of the light. The sensing device 1 comprises a photo element 10, a comparison circuit 11, a logic circuit 12, a reset capacitor Cr, and a feedback capacitor Cf. In the embodiment, the photo element 10 is implemented by a photodiode, wherein a cathode thereof is coupled to a power source VDD and an anode thereof is coupled to a node N10. A first terminal of the reset capacitor Cr receives a reset signal Vreset, and a second terminal thereof is coupled to the node N10. The feedback capacitor Cf is coupled between the logic circuit 12 and the node N10.

Figure 1:
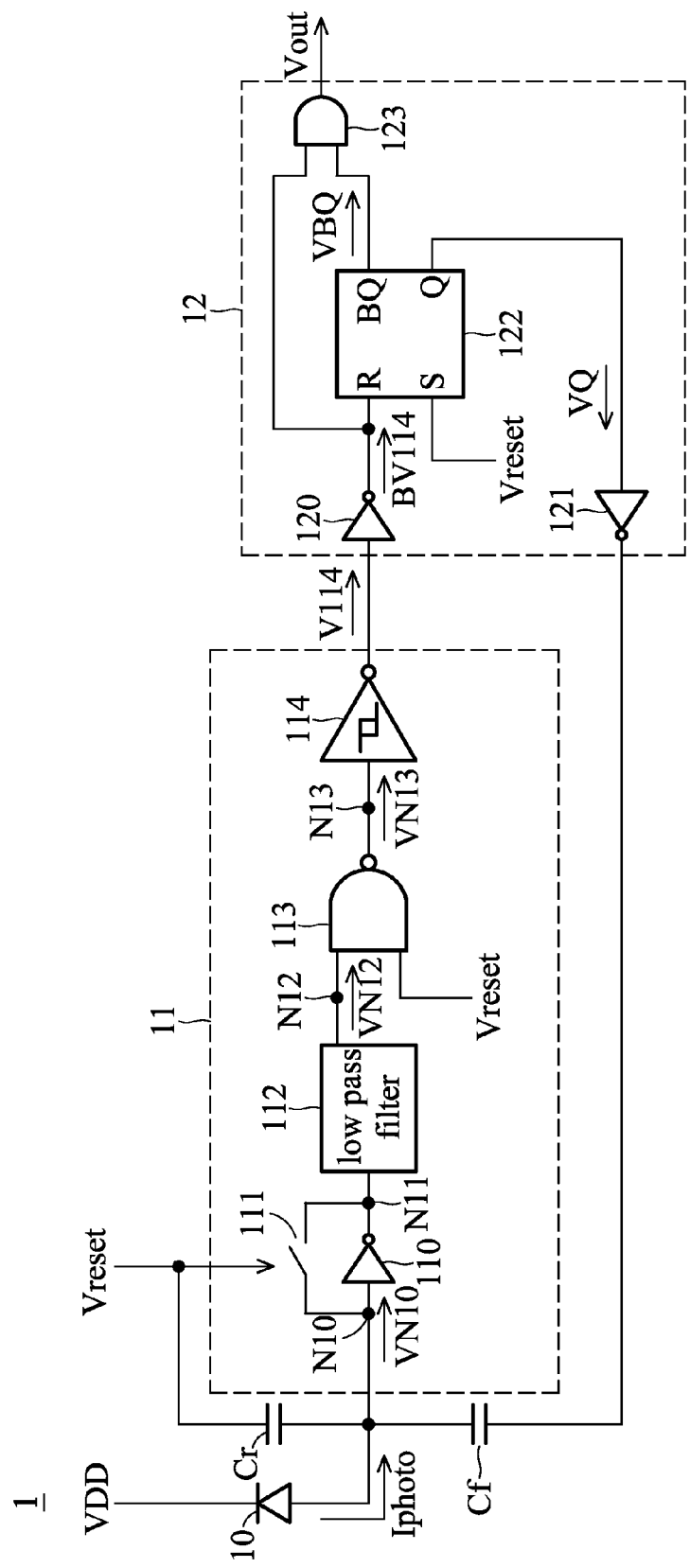
FIG. 1 shows an exemplary embodiment of a sensing device.

Referring to FIG. 1, the comparison circuit 11 comprises an inverter 110, a reset switch 111, a low pass filter 112, an NAND gate 113, and a comparator 114. An input terminal of the inverter 110 is coupled to the node N10, and an output terminal thereof is coupled to the node N11. The reset switch is coupled between the nodes N10 and N11. An input terminal of the low pass filter 112 is coupled to the node N11, and an output terminal thereof is coupled to a node N12. One input terminal of the NAND gate 113 is coupled to the node N12, and the other input terminal thereof receives the reset signal Vreset. An output terminal of the NAND gate 113 is coupled to a node N13. An input terminal of the comparator 113 is coupled to the node N13, and the output terminal thereof generates a result signal V114.

The logic circuit 12 comprises inverters 120 and 121, an SR latch 122, and an AND gate 123. An input terminal of the inverter 120 is coupled to the output terminal of the comparator 114 for receiving the result signal V114, and an output terminal thereof generates an inverse result signal BV114. A reset input terminal R of the SR latch 122 is coupled to the output terminal of the inverter 120 for receiving the inverse result signal BV114, and a setting input terminal S thereof receives the reset signal Vreset. One output terminal Q of the SR latch 122 generates a latch output signal VQ, and the other output terminal BQ thereof generates an inverse latch output signal VBQ. One input terminal of the AND gate 123 is coupled to the output terminal of the inverter 120 for receiving the inverse result signal BV114, the other input terminal thereof is coupled to the output terminal BQ of the SR latch 122 for receiving the inverse latch output signal VBQ, and an output terminal thereof generates the sensing output signal Vout.

Figure 2:
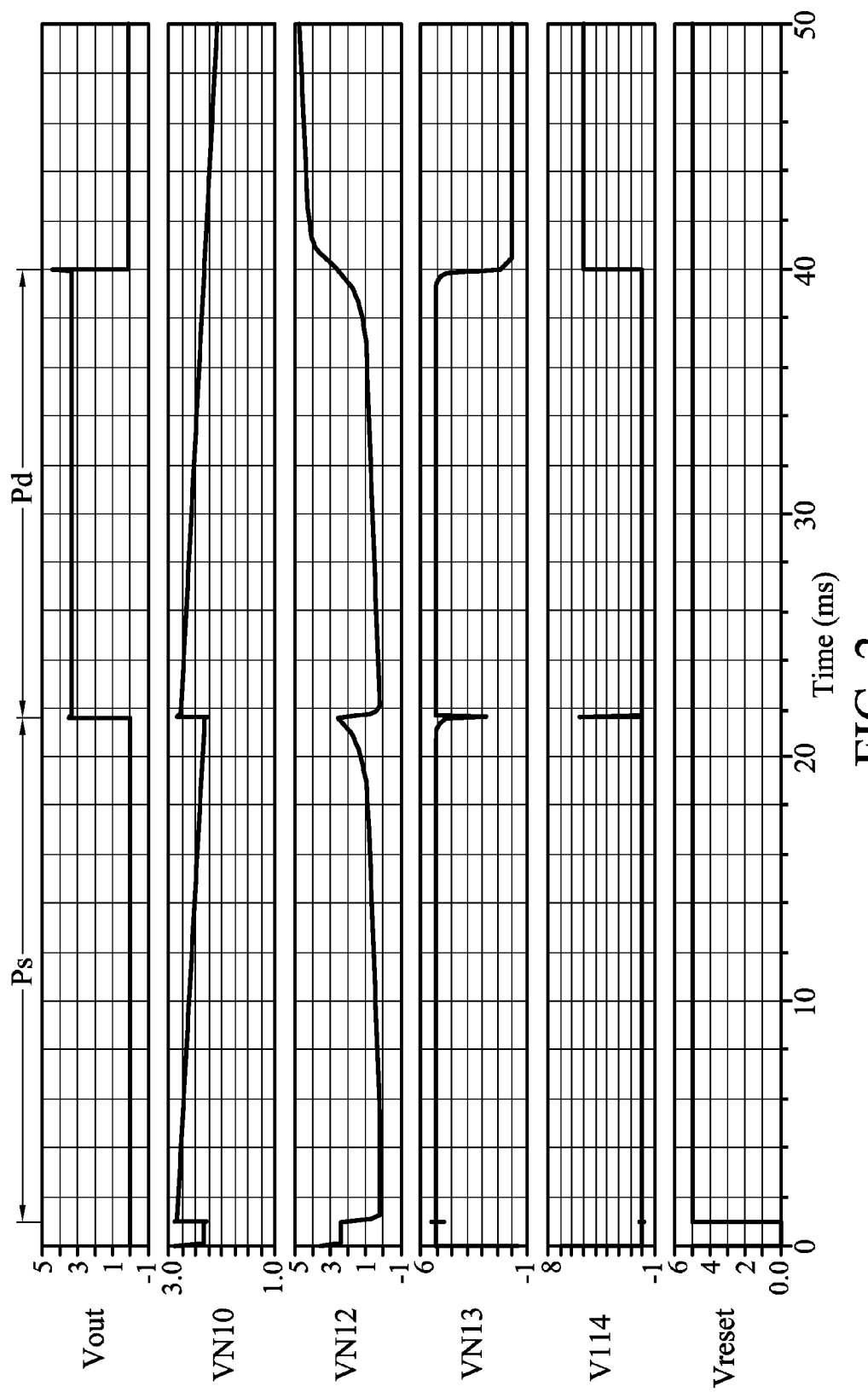
FIG. 2 is a signal timing chart of the sensing device in FIG. 1.

FIG. 2 is a signal timing chart of the signals in the sensing device 1 of FIG. 1. Referring to FIGS. 1 and 2, before entering a sensing period Pd, the sensing device 1 operates in a setting period Ps. During the setting period Ps, the reset signal Vreset is asserted, that is the reset signal Vreset is switched to a high logic level from a low logic level. The reset switch 111 is turned off according to the reset signal Vreset with the high logic level. Moreover, the reset capacitor Cr is charged according to the reset signal Vreset, so that a voltage signal VN10 at the node N10 rises. Since the photo element 10 is sensing light and generates a current Iphoto, the level of the voltage signal VN10 gradually lowers during the setting period Ps. The voltage signal VN10 is inverted by the inverter 110, and the inverse signal of the voltage signal VN10 is then input to the low pass filter 112. The low pass filter 112 filters a high frequency component of the inverse signal of the voltage signal VN10 and generates a voltage signal VN12 with the low logic level at the node N12. The NAND gate 113 receives the voltage signal VN12 with the low logic level and the reset signal Vreset with the high logic level. The NAND gate 113 performs a logic operation to the voltage signal VN12 and the reset signal Vreset and generates a voltage signal VN13 with the high logic level at the node N13. The comparator 114 receives the voltage signal VN13 and compares the voltage signal VN13 with a threshold value to generate the result signal V114. Referring to FIG. 2, during the setting period Ps, the level of the voltage signal VN13 is higher than the threshold value, so that the result signal V114 is at the low logic level. The result signal V114 is then provided to the input terminal of the inverter 120 in the logic circuit 12. The result signal V114 with the low logic level is inverted by the inverter 120, and the output terminal of the inverter 120 generates the inverse result signal BV114 with the high logic level. The inverse result signal BV114 with the high logic level is transmitted to the reset input terminal R of the SR latch 122. The setting input terminal S of the SR latch 122 receives the reset signal Vreset. The SR latch 122 generates the latch output signal VQ with the high logic level at the output terminal Q and the inverse latch output signal VBQ with the low logic level at the output terminal BQ according to the inverse result signal BV114 with the high logic level and the reset signal Vreset with the high logic level. One input terminal of the AND gate 123 receives the inverse result signal BV114 with the high logic level, and the other input terminal thereof receives the inverse latch output signal VBQ with the low logic level. The AND gate 123 thus generates the sensing output signal Vout with the low logic level.

During the period when the level of the voltage signal VN10 gradually lowers, the voltage signals VN12 and VN13 also change with the voltage signal VN10. Referring to FIG. 2, when the voltage signal VN12 is lower than a specific voltage, the comparator 114 determines that the voltage signal VN13 is lower than the threshold value, and the result signal V114 is switched to the high logic level. In the embodiment, the specific voltage is 2.28V. The result signal V114 with the high logic level is inverted by the inverter 120, and the output terminal of the inverter 120 generates the inverse result signal BV114 with the low logic level. The inverse result signal BV114 with the low logic level is transmitted to the reset input terminal R of the SR latch 122. The SR latch 122 generates the latch output signal VQ with the low logic level at the output terminal Q and the inverse latch output signal VBQ with the high logic level at the output terminal BQ according to the inverse result signal BV114 with the low logic level and the reset signal Vreset with the high logic level. One input terminal of the AND gate 123 receives the inverse result signal BV114 with the low logic level, and the other input terminal thereof receives the inverse latch output signal VBQ with the high logic level. The AND gate 123 thus continuously generates the sensing output signal Vout with the low logic level.

At this time, the latch output signal VQ with the low logic level is inverted by the inverter 121, and the inverter 121 transmits a signal with the high logic level to the feedback capacitor Cf. The feedback capacitor Cf is charged, so that the level of the voltage signal VN10 at the node N10 rises again. Then, the photo element 10 continuously senses light to generate the current Iphoto, so that the level of the voltage signal VN10 then gradually lowers. The low pass filter 112 filters a high frequency component of the inverse signal of the voltage signal VN10 generated by the inverter 110 and generates the voltage signal VN12 with the low logic level at the node N12. The NAND gate 113 performs the logic operation to the voltage signal VN12 with the low logic level and the reset signal Vreset with the high logic level, so that the voltage signal VN13 generated by the NAND gate 113 is switched back to the high logic level at the node N13, and the voltage signal VN13 is higher than the threshold value. By comparing the voltage signal VN13 and the threshold value, the result signal V114 generated by the comparator 114 is switched to the low logic level from the high logic level. The inverse result signal BV114 generated by the inverter 120 is switched to the high logic level from the low logic level. The SR latch 122 continuously generates the latch output signal VQ with the low logic level at the output terminal Q and the inverse latch output signal VBQ with the high logic level at the output terminal BQ according to the inverse result signal BV114 with the high logic level and the reset signal Vreset with the high logic level. According to the inverse result signal BV114 with the high logic level and the inverse latch output signal VBQ with the high logic level, the sensing output signal Vout generated by the AND gate 123 is switched to the high logic level from the low logic level.

Since the level of the voltage signal VN10 gradually lowers, the voltage signal VN13 also changes with the voltage signal VN10. When the voltage signal VN13 is lower than the threshold value, the result signal V114 generated by the comparator 114 is switched to the high logic level from the low logic level. The inverse result signal BV114 with the low logic level is transmitted to the reset input terminal R of the SR latch 122. The SR latch 122 continuously generates the latch output signal VQ with the low logic level at the output terminal Q and the inverse latch output signal VBQ with the high logic level at the output terminal BQ according to the inverse result signal BV114 with the low logic level and the reset signal Vreset with the high logic level. The AND gate 123 receives the inverse result signal BV114 with the low logic level and the inverse latch output signal VBQ with the high logic level. The sensing output signal Vout generated by the AND gate 123 is thus switched to the low logic level from the high logic level. The period when the sensing output signal Vout is continuously at the high logic level is referred to as the sensing period Pd.

According to the above embodiment, the low pass filter 112 is disposed in the front of the comparator 114 in the comparison circuit 11. The high-frequency component/noise on the current signal Iphoto can be filtered, so that the comparator 114 can correctly perform a comparison operation, and the following logic circuit 12 can also correctly perform the logic operation to generate the sensing output signal Vout. In the embodiment, the cut-off frequency of the low pass filter is less than 20 kHz.

Moreover, in the embodiment, the gain of the comparison circuit 11 (that is the equivalent total gain of the inverter 110 and the comparator 114) is low, such as lower than 10. Thus, even if the current signal Iphoto has high-frequency component/noise, the sensing output signal Vout is not seriously affected by the high-frequency component/noise because of the low gain of the comparison circuit 11.

In the embodiment, the reset capacitor Cr and the feedback capacitor Cf have large capacitances, such as 50 fF~500 fF, for degrading the effect of the high-frequency components/noise of the current signal Iphoto.

Figures 3, 4:
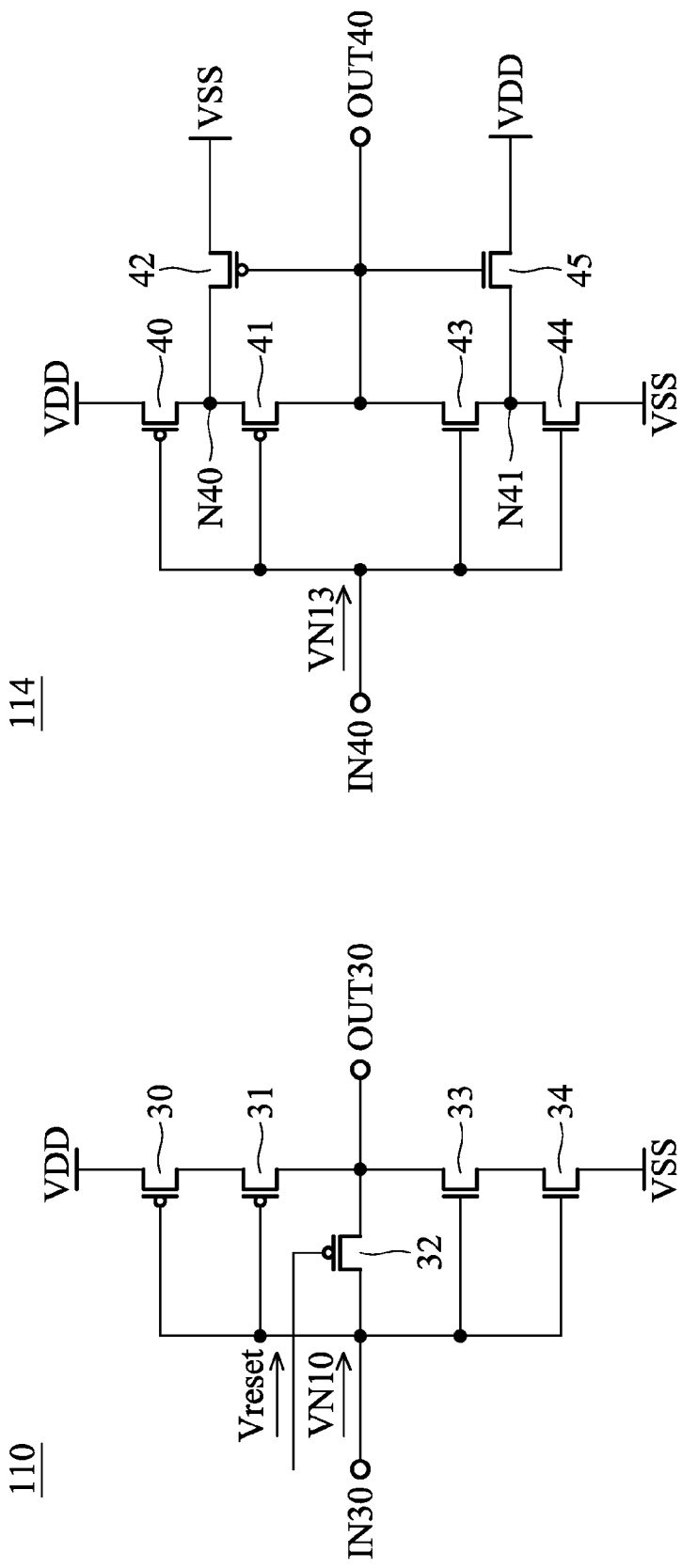
FIG. 3 shows an exemplary embodiment of an inverter.
FIG. 4 shows an exemplary embodiment of a comparator.

FIG. 3 shows an exemplary embodiment of the inverter 110. Referring to FIG. 3, the inverter 110 comprises PMOS transistors 30-32 and NMOS transistors 33-34. An input terminal IN30 of the inverter 110 receives the voltage signal VN10, and an output terminal OUT30 thereof generates the inverse signal of the voltage signal VN10. The PMOS transistors 30 and 31 are coupled in series between a voltage source VDD and the output terminal OUT30. Gates of the PMOS transistors 30 and 31 receive the voltage signal VN10 through the input terminal IN30. The NMOS transistors 33 and 34 are coupled in series between the output terminal OUT30 and a voltage source VSS. Gates of the NMOS transistors 33 and 34 receive the voltage signal VN10 through the input terminal IN30. The NMOS transistor 32 is coupled between the input terminal IN30 and the output terminal OUT30, and a gate of the NMOS transistor 32 receives the reset signal Vreset.

FIG. 4 shows an exemplary embodiment of the comparator 114. Referring to FIG. 4, the comparator 114 comprises PMOS transistors 40-42 and NMOS transistors 43-45. An input terminal IN40 of the comparator 114 receives the voltage signal VN13, and an output terminal OUT40 thereof generates the result signal V114. The PMOS transistors 40 and 41 are coupled between the voltage source VDD and the output terminal OUT40. Gates of the PMOS transistors 40 and 41 receive the voltage signal VN13 through the input terminal IN40. The NMOS transistors 43 and 44 are coupled in series between the output terminal OUT40 and the voltage source VSS. Gates of the transistors 43 and 44 receive the voltage signal VN13 through the input terminal IN40. The PMOS transistor 42 is coupled between the voltage source VSS and a common connection node N40 of the PMOS transistors 40 and 41, and a gate of the PMOS transistor 42 receives the result signal V114. The NMOS transistor 45 is coupled between the voltage source VDD and a common connection node N41 of the NMOS transistors 43 and 44, and a gate of the NMOS transistor 45 receives the result signal V114. The inverter and comparator of FIGS. 3 and 4 are given as examples without limitation in the invention.

FIG. 5 shows an exemplary embodiment of an electronic apparatus. Referring to FIG. 5, an electronic apparatus 5 comprises the sensing device 1 of FIG. 1 and a panel 50. The sensing device 1 senses environmental brightness and generates the sensing output signal Vout for controlling brightness of the panel 50. The panel 50 displays corresponding images by the brightness determined by the sensing output signal Vout. In the embodiment, the electronic apparatus 5 can be a personal digital assistant (PDA), a cellular phone, a digital camera, a television, a global positioning system (GPS), an automotive displayer, an aviatic displayer, a digital photo frame, a notebook computer, or a tablet computer.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A sensing device for sensing light and generating a sensing output signal indicating intensity of the light, comprising
    a photo element for sensing the light and generating a current signal at a first node;
    a comparison circuit, coupled to the first node, for receiving the current signal, wherein the comparison circuit comprises a filter for filtering a high-frequency component on the current signal, and the comparison circuit generates a result signal according to the filtered current signal;
    a logic circuit for receiving the result signal and performing a logic operation to the result signal to generate the sensing output signal;
    a reset capacitor having a first terminal receiving a reset signal and a second terminal coupled to the first node, wherein when the sensing device is sensing the light, the reset signal is asserted; and
    a feedback capacitor coupled between the logic circuit and the first node, wherein the reset capacitor and the feedback capacitor have large capacitances.

2. The sensing device as claimed in claim 1, wherein the comparison circuit has a gain, and the gain of the comparison circuit is lower than 10.

3. The sensing device as claimed in claim 1, wherein a cut-off frequency of the filter is less than 20 kHz.

4. The sensing device as claimed in claim 1, wherein the capacitance of each of the reset capacitor and the feedback capacitor is between 50 fF and 500 fF.

5. The sensing device as claimed in claim 1, wherein the filter has an input terminal coupled to a second node and an output terminal coupled to a third node, and the comparison circuit further comprises:
    an inverter having an input terminal coupled to the first node and an output terminal coupled to the second node;
    a reset switch coupled between the first node and the second node, wherein when the sensing device is sensing the light, the reset switch is turned off according to the asserted reset signal;
    an NAND gate having a first input terminal coupled to the third node, a second input terminal receiving the reset signal, and an output terminal coupled to a fourth node; and
    a comparator having an input terminal coupled to the fourth node and an output terminal generating the result signal.

6. The sensing device as claimed in claim 5, wherein an equivalent total gain of the inverter and the comparator is lower 10.

7. The sensing device as claimed in claim 1, wherein the logic circuit comprises:
    a first inverter having an input terminal receiving the result signal and an output terminal generating an inverse result signal;
    an SR latch having a reset input terminal receiving the inverse result signal, a setting input terminal receiving the reset signal, a first output terminal generating a latch output signal, and a second output terminal generating an inverse latch output signal;

an AND gate having a first input terminal receiving the inverse result signal, a second input terminal receiving the inverse latch output signal, and an output terminal generating the sensing output signal; and a second inverter having an input terminal receiving the latch output signal and an output terminal coupled to the feedback capacitor.

8. A sensing device for sensing light and generating a sensing output signal indicating intensity of the light, comprising a photo element for sensing the light and generating a current signal at a first node;

a comparison circuit, coupled to the first node, for receiving the current signal and generating a result signal according to the current signal, wherein the comparison circuit has a low gain;

a logic circuit for receiving the result signal and performing a logic operation to the result signal to generate the sensing output signal;

a reset capacitor having a first terminal receiving a reset signal and a second terminal coupled to the first node, wherein when the sensing device is sensing the light, the reset signal is asserted; and a feedback capacitor coupled between the logic circuit and the first node.

9. The sensing device as claimed in claim 8, wherein the gain of the comparison circuit is lower than 10.

10. The sensing device as claimed in claim 8, wherein the comparison circuit comprises a filter for filtering a high-frequency component on the current signal.

11. The sensing device as claimed in claim 10, wherein a cut-off frequency of the filter is less than 20 kHz.

12. The sensing device as claimed in claim 8, wherein capacitance of each of the reset capacitor and the feedback capacitor is between 50 fF and 500 fF.

13. The sensing device as claimed in claim 8, wherein the comparison circuit comprises:

an inverter having an input terminal coupled to the first node and an output terminal coupled to a second node;

a reset switch coupled between the first node and the second node, wherein when the sensing device is sensing the light, the reset switch is turned off according to the asserted reset signal;

a low pass filter having an input terminal coupled to the second node and an output terminal coupled to a third node;

an NAND gate having a first input terminal coupled to the third node, a second input terminal receiving the reset signal, and an output terminal coupled to a fourth node; and a comparator having an input terminal coupled to the fourth node and an output terminal generating the result signal.

14. The sensing device as claimed in claim 13, wherein an equivalent total gain of the inverter and the comparator is lower 10.

15. The sensing device as claimed in claim 13, wherein a cut-off frequency of the low pass filter is less than 20 kHz.

16. The sensing device as claimed in claim 8, wherein the logic circuit comprises:

a first inverter having an input terminal receiving the result signal and an output terminal generating an inverse result signal;

an SR latch having a reset input terminal receiving the inverse result signal, a setting input terminal receiving the reset signal, a first output terminal generating a latch output signal, and a second output terminal generating an inverse latch output signal;

an AND gate having a first input terminal receiving the inverse result signal, a second input terminal receiving the inverse latch output signal, and an output terminal generating the sensing output signal; and a second inverter having an input terminal receiving the latch output signal and an output terminal coupled to the feedback capacitor.

17. An electronic apparatus comprising:

a panel for displaying images according to a sensing output signal; and a sensing device as claimed in claim 1 for sensing environmental brightness and generating the sensing output signal to control brightness of the panel.

18. The electronic apparatus as claimed in claim 17, wherein the electronic apparatus is a personal digital assistant (PDA), a cellular phone, a digital camera, a television, a global positioning system (GPS), an automotive displayer, an aviatic displayer, a digital photo frame, a notebook computer, or a tablet computer.

* * * * *